(12) United States Patent
Mj

(10) Patent No.: US 9,213,899 B2
(45) Date of Patent: Dec. 15, 2015

(54) CONTEXT-AWARE TRACKING OF A VIDEO OBJECT USING A SPARSE REPRESENTATION FRAMEWORK

(71) Applicant: INTERNATIONAL BUSINESS MACHINES CORPORATION, Armonk, NY (US)

(72) Inventor: Ashwini Mj, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 25 days.

(21) Appl. No.: 14/223,557

(22) Filed: Mar. 24, 2014

(65) Prior Publication Data

US 2015/0269441 A1 Sep. 24, 2015

(51) Int. Cl.
*G06K 9/00* (2006.01)
*G06T 11/60* (2006.01)
*G06K 9/62* (2006.01)

(52) U.S. Cl.
CPC .......... *G06K 9/00744* (2013.01); *G06K 9/6201* (2013.01); *G06T 11/60* (2013.01)

(58) Field of Classification Search
None
See application file for complete search history.

(56) References Cited

U.S. PATENT DOCUMENTS

2011/0222787 A1* 9/2011 Thiemert et al. .............. 382/225

OTHER PUBLICATIONS

Xu et al ("Visual Tracking via Adaptive Structural Local Sparse Appearance Model", IEEE 2012, pp. 1822-1829).*

Xiaoqiang et al, "Robust visual tracking with discriminative sparse learning", Elsevier, Pattern Recognition 46 (2013) 1762-1771.*
Xue et al, "Robust Visual Tracking using I1 Minimization", 2009 IEEE, pp. 1436-1443, 12th International Conference on Computer Vision (ICCV).*
A. Mj, et al., "Context-Aware Real-Time Tracking in Sparse Representation Framework", 20TH IEEE International Conference on Image Processing (ICIP), Sep. 15-18, 2013, pp. 2450-2454.
A. Yilmaz et al., "Object Tracking: A Survey", ACM Computing Surveys, vol. 38, No. 4, 2006, pp. 1-31.
A.C. Sankaranarayanan et al., "Object Detection, Tracking and Recognition for Multiple Smart Cameras", Proceedings of the IEEE, vol. 96, No. 10, 2008, pp. 1606-1624.
I. Gu et al., "Chapter 5: Online Learning and Robust Visual Tracking Using Local Features and Global Appearances of Video Objects", in Object Tracking, Hanna Goszczynska, Ed., in Tech, 2011, pp. 89-118.
X. Mei et al., "Robust Visual Tracking Using L1 Minimization", Proceedings of the IEEE International Conference on Computer Vision, 2009, pp. 1436-1443.

(Continued)

*Primary Examiner* — Amara Abdi
(74) *Attorney, Agent, or Firm* — John R. Pivnichny; Law Office of Jim Boice

(57) ABSTRACT

A method, system, and/or computer program product tracks an object in a video. A bounding box is defined by the user in a first frame, thus representing the object to be tracked based on a point of interest. A static dictionary D is populated with the densely overlapping patches from a search window. A new frame in the video is detected, and candidate patches, in the new frame, that potentially depict the object being tracked are identified. The candidate patches are co-located with the multiple densely overlapping patches to form a dynamic candidate dictionary Y of candidate patches. Candidate patches that best match the densely overlapping patches from the first frame are identified by an L1-norm solution, in order to identify a best-matched patch in the new frame.

12 Claims, 8 Drawing Sheets

(56) References Cited

OTHER PUBLICATIONS

C. Bao et al., "Real Time Robust L1 Tracker Using Accelerated Proximal Gradient Approach", Proceedings of the IEEE Conference on Computer Vision and Pattern Recognition (CVPR 2012), 2012, pp. 1830-1837.

X. Jia et al., "Visual Tracking Via Adaptive Structural Local Sparse Appearance Model", Proceedings of the IEEE Conference on Computer Vision and Pattern Recognition (CVPR 2012), 2012, pp. 1822-1829.

K. Zhang et al., "Real-Time Compressive Tracking", Proceedings of European Conference on Computer Vision (ECCV 2012), Vol. 3, 2012, pp. 864-877.

W. Zhong et al., "Robust Object Tracking Via Sparsity-Based Collaborative Model", Proceedings of the IEEE Conference on Computer Vision and Pattern Recognition (CVPR 2012), 2012, pp. 1838-1845.

J. Mairal, Dev., "About: What is Spams?" <http://spams-devel.gforge.inria.fr/index.html> Last Modified Jan. 8, 2014, Retrieved Mar. 21, 2014, pp. 1-3.

* cited by examiner

| VIDEOS (NUMBER OF FRAMES) | EXECUTION TIME (SECONDS) | | | | |
|---|---|---|---|---|---|
| | NEW TRACKER | APG | SGM | VT | CT |
| TRELLIS (560) | 0.0311 | 0.093 | 3.554 | 0.109 | 0.015 |
| FACE (500) | 0.0316 | 0.095 | 3.562 | 0.108 | 0.019 |
| PANDA (900) | 0.0314 | 0.099 | 3.564 | 0.112 | 0.021 |
| PKTEST02 (450) | 0.0309 | 0.091 | 3.559 | 0.103 | 0.018 |

| VIDEOS (NUMBER OF FRAMES) | TRAJECTORY ERROR (RMSE) | | | | |
|---|---|---|---|---|---|
| | NEW TRACKER | APG | SGM | VT | CT |
| TRELLIS | 10.44 | 24.77 | 268.45 | 16.19 | 81.33 |
| FACE | 11.27 | 40.68 | 20.56 | 13.63 | 54.43 |
| PANDA | 8.61 | 64.72 | 328.49 | 7.47 | 128.50 |
| PKTEST02 | 3.13 | 105.64 | 21.60 | 3.89 | 109.52 |

FIG. 8

CONTEXT-AWARE TRACKING OF A VIDEO OBJECT USING A SPARSE REPRESENTATION FRAMEWORK

STATEMENT REGARDING PRIOR DISCLOSURES BY THE INVENTOR

The following disclosure is submitted under 35 U.S.C. 102(b)(1)(A):

"Context-Aware Real-Time Tracking in Sparse Representation Framework", Ashwini M J, R. Venkatesh Babu, and K. R. Ramakrishnan, made publicly available on May 3, 2013, published in: 2013 20th IEEE International Conference on Image Processing (ICIP), Sep. 15-18, 2013, pp. 2450-2454.

BACKGROUND

The present disclosure relates to the field of computers, and specifically to the use of computers in processing video images. Still more particularly, the present disclosure relates to tracking movements of objects in moving video images.

Real-time videos and/or recorded videos often capture images of entities such as persons, animals, vehicles, and other objects that are in motion. That is, such entities are often moving from point A to point B within the frames of the video images. It is a simple task for a human to follow such movements. However, this task is very difficult for a computer. That is, tracking the movement of a video object (i.e., image of the entity that is moving about) is a difficult task in an unconstrained environment due to the variations in factors such as pose, size, illumination, partial occlusion and motion blur.

SUMMARY

A method, system, and/or computer program product tracks an object in a video. A bounding box is defined by the user in a first frame, thus representing the object to be tracked based on a point of interest. A static dictionary D is populated with the densely overlapping patches from a search window. A new frame in the video is detected, and candidate patches, in the new frame, that potentially depict the object being tracked are identified. The candidate patches are co-located with the multiple densely overlapping patches to form a dynamic candidate dictionary Y of candidate patches. Candidate patches that best match the densely overlapping patches from the first frame are identified by an L1-norm solution, in order to identify a best-matched patch in the new frame.

BRIEF DESCRIPTION OF THE SEVERAL VIEWS OF THE DRAWINGS

FIG. 8 illustrates tables comparing execution times and trajectory errors for the present invention compared to prior art systems.

DETAILED DESCRIPTION

Figure 1:
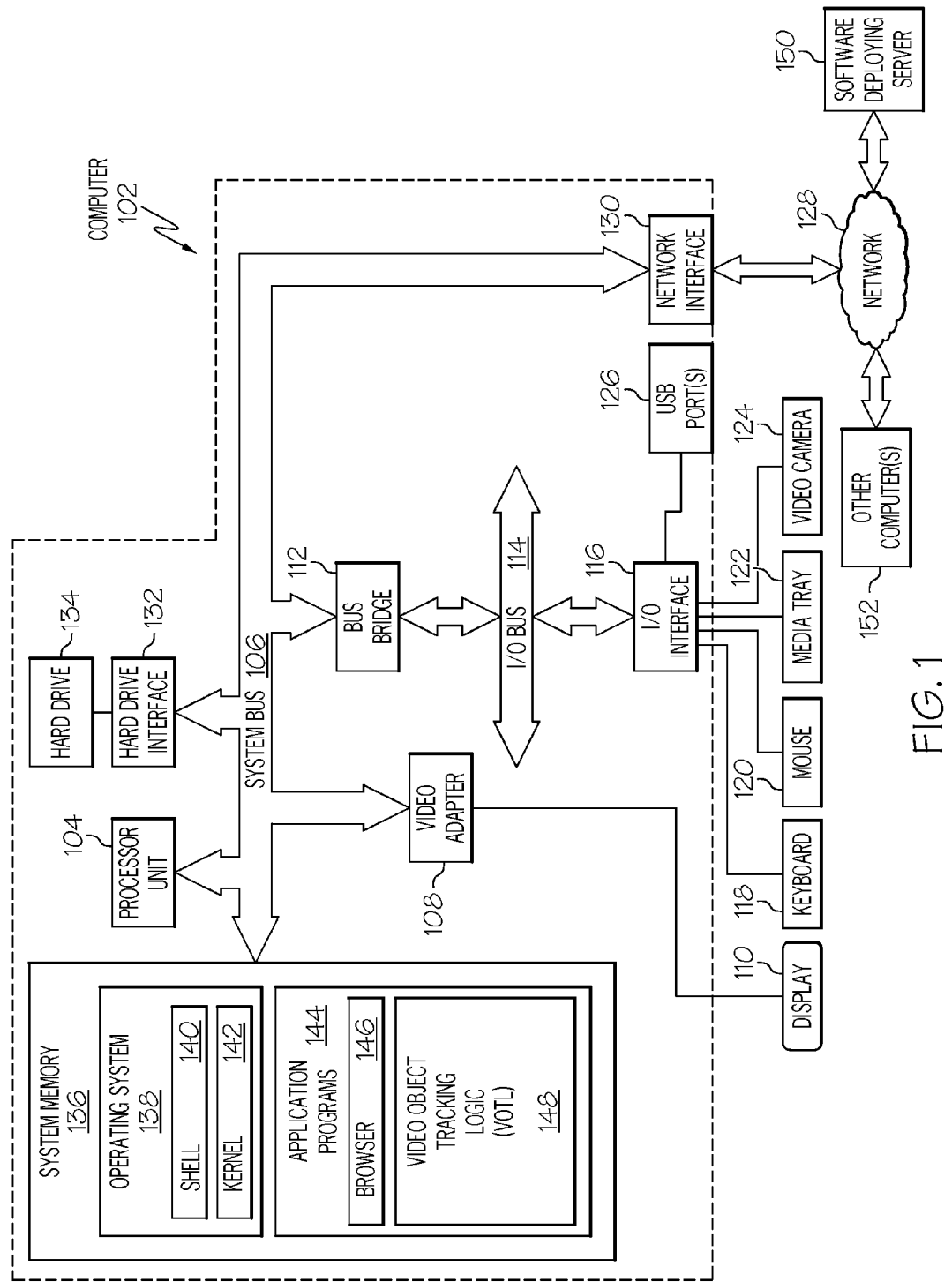
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a video camera 124 (i.e., a camera capable of capturing and/or storing moving images), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Video Object Tracking Logic (VOTL) 148. VOTL 148 includes code for implementing the processes described below, including those described in FIGS. 2-8. In one embodiment, computer 102 is able to download VOTL 148 from software deploying server 150, including in an on-demand basis, wherein the code in VOTL 148 is not downloaded until needed for execution. Note further that, in one embodiment of the present invention, software deploying server 150 performs all of the functions associated with the present invention (including execution of VOTL 148), thus freeing computer 102 from having to use its own internal computing resources to execute VOTL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

A movie video (or simply "video") is a collection of multiple screen images known as "frames". Each subsequent frame shows one or more entities within a previous frame at a different location, thus producing the appearance of movement of those entities when the frames are presented in a sequential manner. That is, an Object A is shown at Point X in a first frame, and then Object A is shown at a different Point Y in the next frame. By displaying the first frame and then the next frame, Object A appears to be moving from Point X to Point Y.

In accordance with one or more embodiments of the present invention, each frame in the video is subdivided into multiple subareas, called "patches". All of the patches for a particular screen (or portion of the screen that contains an object of interest) are stored in a single file, known as a "dictionary", or more specifically an "object dictionary" of captured image objects. These patches, when stored in a dictionary, are known as "atoms" of that dictionary. The patches can overlap one another. When the patches overlap each other to the point that they nearly cover one another up, they are known as "densely overlapped patches".

In order to track a particular object in the video, a search window is utilized. A search window is an area of the screen that includes the object being tracked and a predetermined quantity of surrounding pixels. As with any other area on the screen, the search window is made up of overlapping patches (or even "densely overlapped patches"), which are captured in an initial screen and placed in an initial dictionary of overlapping patches, referred to herein as "D". Overlapping patches of the search window from a subsequent screen are placed in a subsequent dictionary of overlapping patches, referred to herein as "Y". Thus, the present invention uses two dictionaries, where one (D) is static, having been initialized with the object selected in the first frame, while the other (Y) is dynamic, since it is updated based on the spatial information obtained from a confidence map.

As described in detail below, the present invention utilizes a local sparse representation (i.e., a system for linearly comparing atoms/patches from different frames) to track the movement of an object in a video. More specifically, local sparse representation is used to identify atoms/patches from different frames that capture a same image of a same object. This local sparse representation is able to handle variations such as pose, size, illumination, partial occlusion and motion blur to objects being tracked.

The local sparse representation leads to creation of the "confidence map", which is a visual mapping of how likely a patch from a first frame is to be of a same object (or area thereof) in a subsequent frame. Thus, the object being tracked is localized by utilizing the mode of the confidence map.

The present invention thus presents a context based method to discriminate patches of the foreground of a frame/screen with those in the background, thereby isolating the object being tracked in the video. Candidate patches (i.e., patches from a subsequent frame/screen that might correlate to one or more patch from the initial frame/screen) are sparsely represented as entries in the dictionary Y, and a foreground/background classification is done by computing the confidence map based on the distribution of sparse coefficients, as described in detail below.

In one embodiment, the present novel tracker exploits a hierarchical pyramidal structure to robustly model atoms from the object dictionary (both D and Y) at various scales. This hierarchical pyramidal structure depicts an object at different scales. These differently scaled images create a dictionary that can handle scale changes.

Therefore, as an overview of the present invention, one embodiment utilizes a search window, which is constructed across an object from a first frame of video, and relatively tracks the object of interest in the subsequent frames. That is, search windows from subsequent frames in the video are then searched and compared, specifically by comparing patches between frames. An object dictionary is created based on the overlapping patches that are initialized in the first frame, called the static dictionary, and a dynamic dictionary is updated based on the spatial information obtained from the confidence map.

As described herein, in one embodiment, a pyramidal structure is used to represent objects at different scales. A suitable dictionary update strategy is used to alleviate the drift problem during tracking. Numerous experiments on challenging videos demonstrate that the present novel tracker (i.e., identified as the "new tracker" in FIG. 8) outperforms several state-of-the-art algorithms. The present approach tracks at a high processing speed and is suitable for real-time applications. It is seen that the present approach can track the object at 32 fps (frames per second).

In one embodiment, the video being examined to track objects is in real time (e.g., is a video feed from video camera such as video camera 124 depicted in FIG. 1), while in another embodiment this video is previously recorded video (e.g., a video file stored in a storage device such as hard drive 134 depicted in FIG. 1, which may be in computer 102 and/or in other computer(s) 152.)

Figure 2:
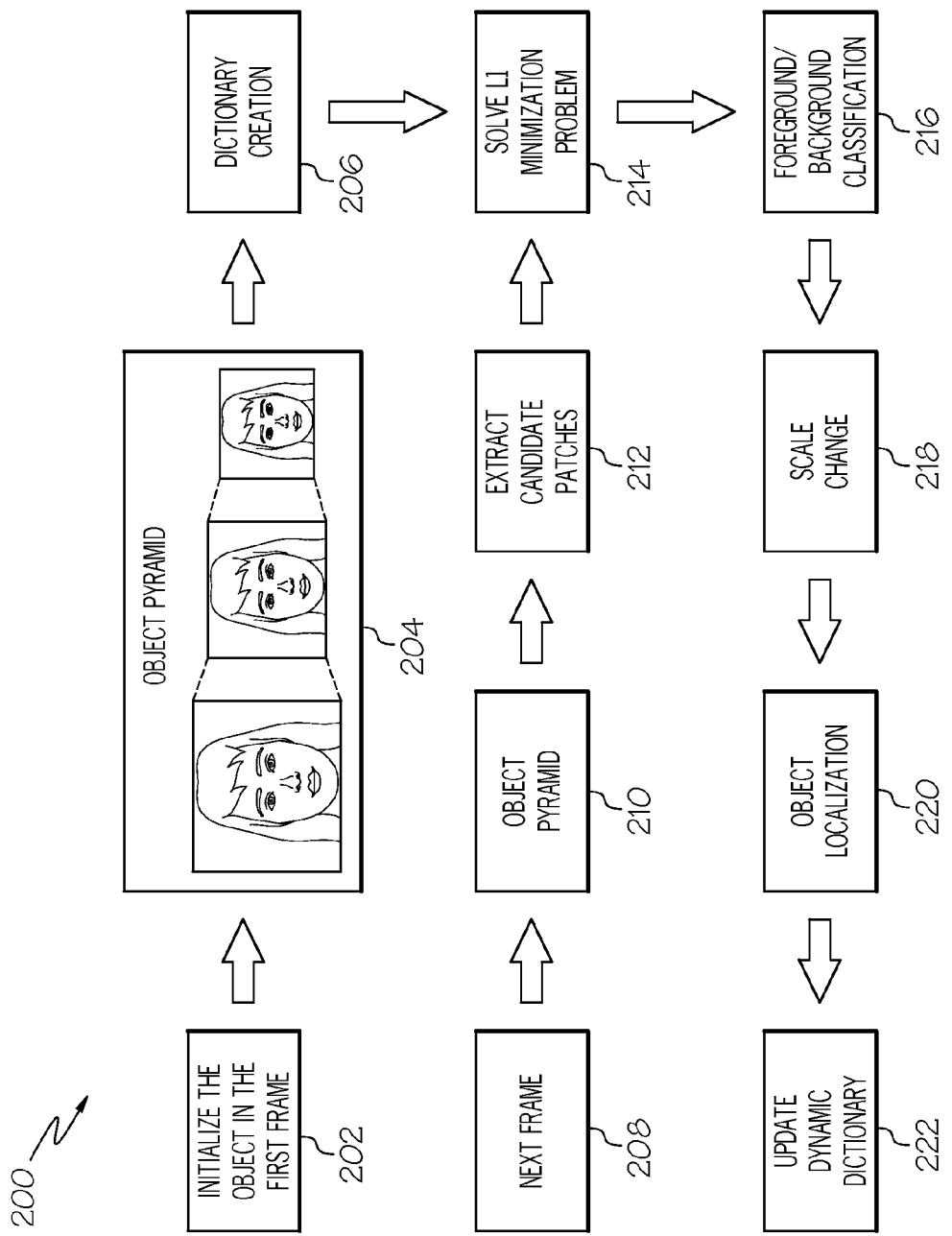
FIG. 2 illustrates a high-level overview of the present system for tracking objects in a video.

With reference now to FIG. 2, an overview of the present inventive method is shown in flowchart 200. At block 202, a first frame is initialized. For example, consider frame 300 in FIG. 3. Frame 300 is an initial frame, showing an object 302 (in this example a person). The initial frame also shows a background, which is of no interest to a tracker. That is, it is movement of the object 302 that needs to be tracked, not the objects in the background that do not move.

Within the frame 300 is an object window 304, which shows the object 302 whose movement is to be tracked. The key identification information for object 302 (e.g., the subject's face) is found within object window 304. However, when the subject's face moves, so does the rest of her head (i.e., her hair). This other screen area is identified as a search window 306. Overlapping patches 308 are subcomponents of not only the search window 306 (as depicted), but also the object window 304 (not depicted). That is, both the object window 304 and the search window 306 are subdivided into unique patches.

Returning to FIG. 2, block 204 depicts the creation of an object pyramid. That is, a same image (e.g., that found in the search window 306 depicted in FIG. 3) is resized to various sizes, thus compensating for the image (but not the tracked object) getting larger or smaller as it moves closer to or farther away from the video camera.

As described in block 206, an initial dictionary (D) is then created of the patches from the initial screen.

As described in block 208, a next frame is then retrieved (either in real time from a video camera or from a stored video file). As with the initial first frame, an object pyramid is created for patches in the next frame (block 210), and candidate patches (that might match one or more patches from the first frame) are extracted (block 212). In order to identify which candidate patch from the next frame is of the same object as a particular patch from the first frame, an L1-norm minimization algorithm (described in detail below) is run (block 214).

In order to handle variations in the foreground and background of the first frame and subsequent frames, areas other than that of the search window 306 (or just the object window 304) are differentiated and partitioned into their own patches (block 216). As with the search/object windows, the foreground/background is adjusted for scale changes using an object pyramid (block 218), thus facilitating the localization (i.e., identifying) of the tracked object (block 220). The dynamic dictionary (Y) is then updated to reflect the changes to both the search/object window as well as the foreground/background (block 222).

Components of the system shown in FIG. 2 are now presented as a "1. NOVEL TRACKER".

1. Novel Tracker 1.1. Dictionary Creation

Visual tracking of an object in a video involves comparison of certain frames of the video with respect to a reference source of object's information. This source information from the initial frame is stored in the form of a dictionary D, which is defined in Equation 1 as:

$$D=[d_1, d_2, \ldots, d_n] \in R^{l \times n} \quad \text{(Equation 1)}$$

where the dictionary D contains an array of atoms/patches ($[d_1, d_2, \ldots, dn]$), which are elements of ($\epsilon$) a matrix R, which is of a size l by n vectors. That is, elements from the array $[d_1, d_2, \ldots, dn]$ are vectorized patches sampled from the target image.

Local patches are co-located in the next frame and vectorized to form a candidate dictionary Y, where:

$$Y=[y_1, y_2, \ldots, y_n] \in R^{l \times n}$$

That is, the dictionary Y contains an array of atoms/patches ($[y_1, y2, \ldots, yn]$), which are elements of ($\epsilon$) a matrix R, which is of a size l by n vectors. In one embodiment, D and Y are the same l×n size. In another embodiment, D and Y are differently sized matrixes. In either embodiment, elements/atoms from the array $[y_1, y2, \ldots, yn]$ are vectorized patches sampled from the next frame/image.

Figure 3:
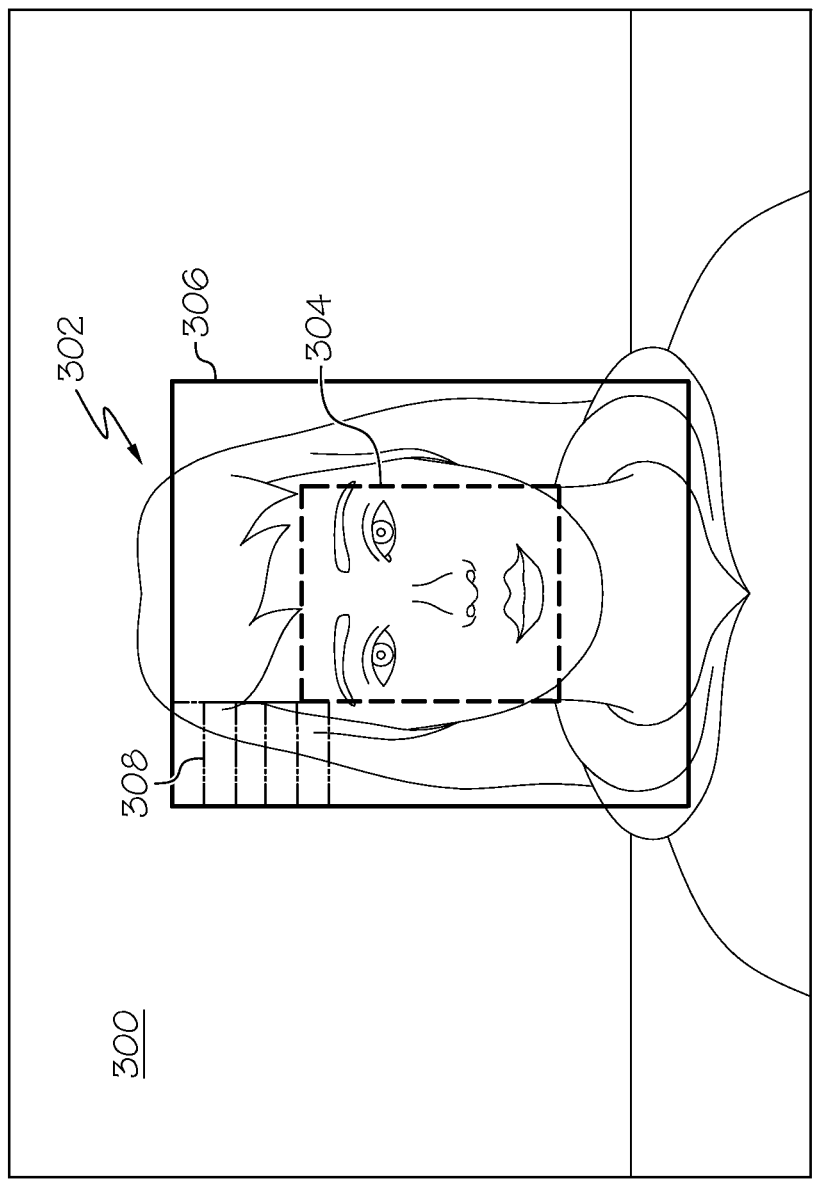
FIG. 3 depicts an exemplary object to be tracked in a video by the present invention.
Figure 4:
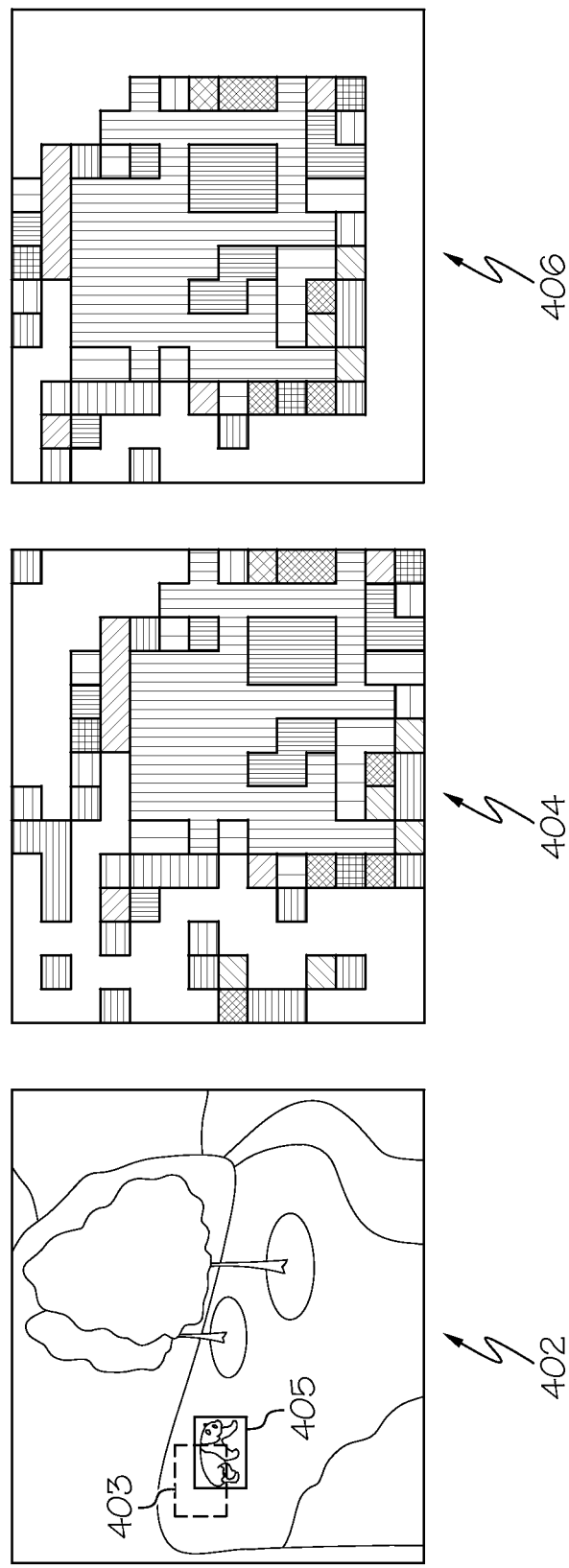
FIG. 4 illustrates an exemplary confidence map of a search/object window that captures the object being tracked in the video.
Figure 5:
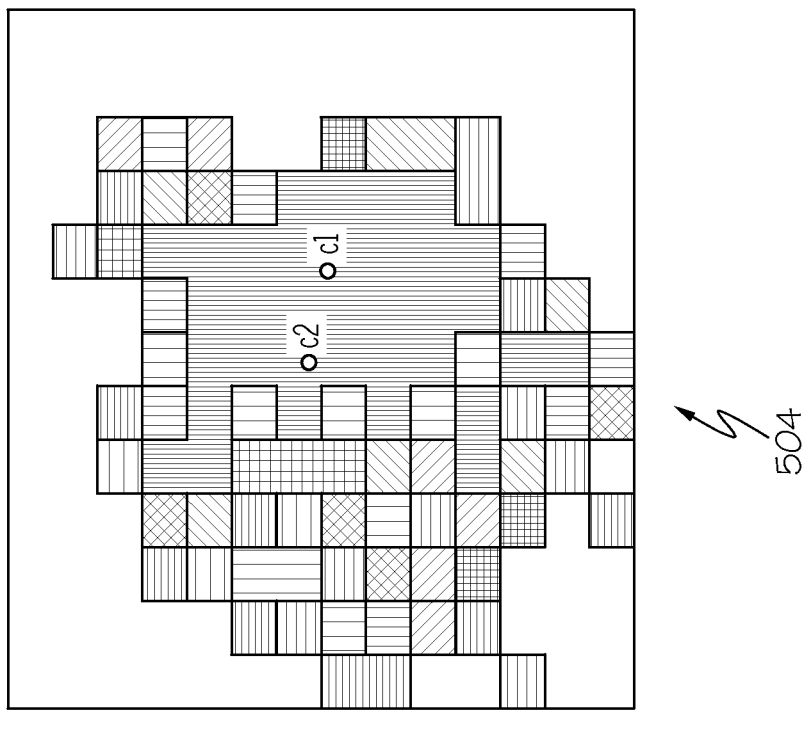
FIG. 5 depicts a confidence map of patches from a partially occluded object in a video.
Figure 5:
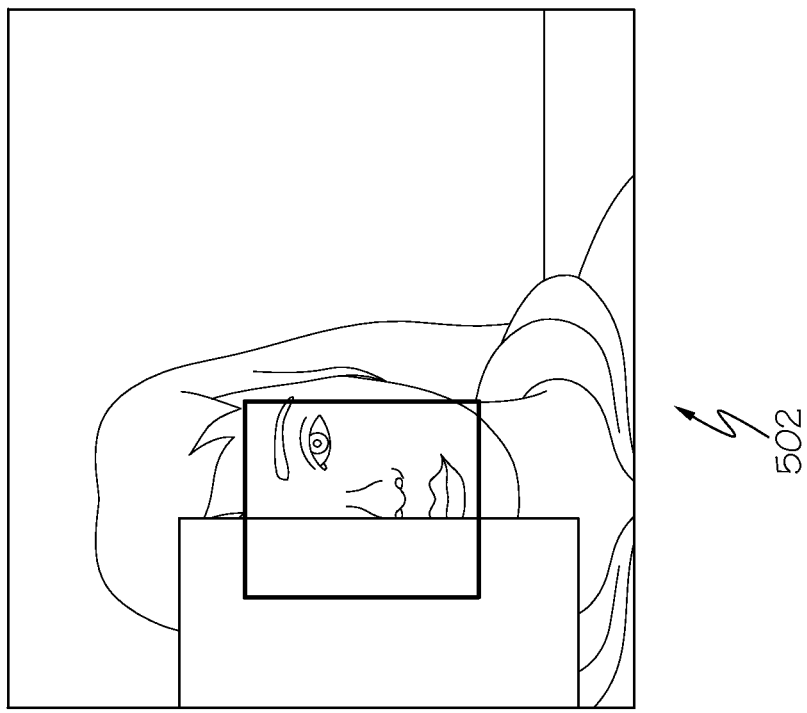
Figure 6:
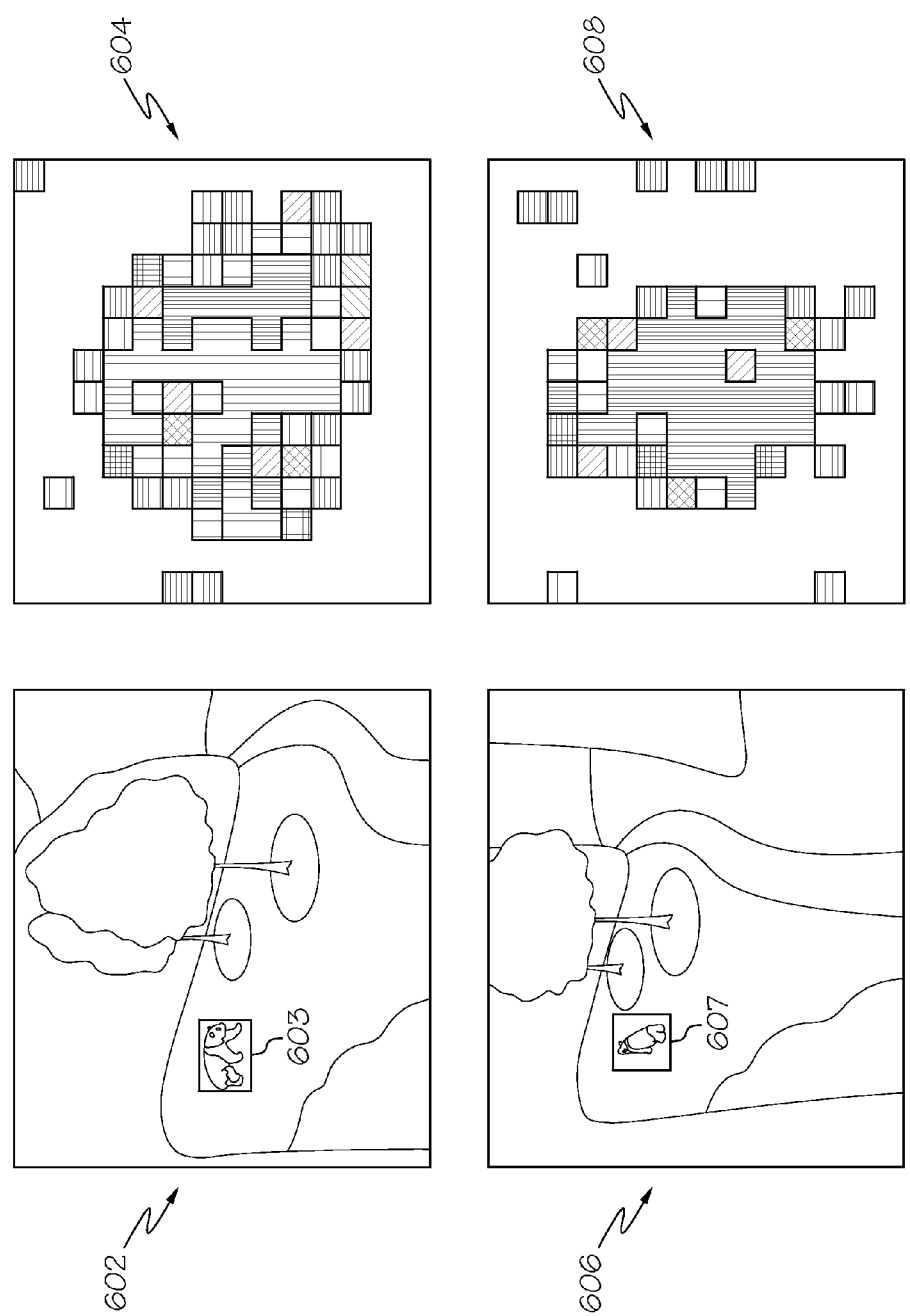
FIG. 6 illustrates confidence maps that are modified by a multi-level object pyramid, which accommodates movements towards and away from a video camera that is capturing a video.

As illustrated above in FIG. 3, a bounding box (e.g., object window 304 and/or search window 306) is defined by a user for a start/initial/first frame (frame 300). That is, in one embodiment the user manually selects an object to be tracked by defining (e.g., using a cursor and area selection feature on the program) the window in which the object to be tracked is initially depicted. As described above, the object window 304 is extended by a few pixels to create search window 306, which includes some parts of the background. As depicted in FIG. 3, densely overlapped patches of size $w_p \times h_p$ (where '$w_p$' denotes the width and '$h_p$' denotes the height of the patch) within the search window are selected to form the atoms of the initial dictionary D. Elements in the dictionary D includes patches from both the object window 304 and neighboring background region (found in search window 306).

Each column in the dictionary D has feature vectors (patches) that uniquely represent certain parts of the target image. As described herein, the object window 304 and the search window 306 in FIG. 3 are partitioned into densely overlapping patches, both in the initial frame (for dictionary D) as well as in subsequent frames (for dictionary Y). Thus, these densely overlapping patches from different frames are used in the creation of the initial dictionary D (for the initial first frame) and the subsequent candidate dictionary Y (for the subsequent frame(s)).

1.2. Sparse Representation Framework

Once feature vectors of a target image (from the start frame) and images (from subsequent frame(s)) are extracted and stored in respective target dictionary 'D' and candidate dictionary 'Y', a candidate patch for each image patch vector in 'Y' is created by a sparse linear combination of the image patch vectors in D. That is, a "candidate patch" is created from a combination of patches from D. This candidate patch is then compared to other patches in Y to identify which of the patches in Y are part of the same image captured by one or more patches from D. Thus, consider a candidate patch $y_k$ as defined in Equation 2:

$$y_k = D\alpha_k \quad \text{(Equation 2)}$$

where candidate patch $y_k$ is created from one or more of the atoms from dictionary D, and $\alpha_k$ is an n-dimensional coefficient vector for the candidate patch '$y_k$'.

When tracking a particular object, a portion of that particular object is represented as a candidate feature vector (i.e., candidate patch '$y_k$'). This candidate feature vector is created by a linear combination of a few patches in the original target image (i.e., atoms from D from the first frame). This combination of patches is called a "sparse representation", or "sparse coding", since only a few patches are required from D to generate the candidate patch $y_k$. That is, the initial dictionary D has more than enough vectors to represent a candidate patch from the subsequent frame. Thus, dictionary D is referred to as being "over-complete". In order to determine which two vectors/patches are likely to be related (i.e., depict the same portion(s) of the tracked object in different frames), the required coefficient vector ($\alpha_k$) is sparse in nature (i.e., the "n" in the n-dimensions of $\alpha_k$ are below a predefined limit). Thus the problem reduces to a problem of linear algebra. That is, in the present sparse representation framework, the given equation ($y_k = D\alpha_k$) is an under-determined system, since 'D' is a fat ("over-complete") matrix.

Use of an L2-norm solution alone with the sparse representation framework is not optimal, since the solution can be too dense (i.e., there can be a large number of non-zero entries corresponding to coefficients of other classes). While a sparse solution using an L0-norm can solve this problem, the sparsity of the solution does not fetch a unique solution for $\alpha$. Hence, a preferred embodiment of the present invention utilizes an L1-norm, given by the following Equation 3:

$$\min \|D\alpha_k - y_k\|_2^2 + \lambda \|\alpha_k\|_1 \quad \text{(Equation 3)}$$

This solution minimizes the square of the L2-norm for the difference/distance between $D\alpha_k$ and $y_k$, and further calculates the L1-norm of $\alpha_k$. Note that lambda ($\lambda$) is a Lagrange multiplier, which is determined by the gradient (i.e., level of difference in appearance and location) between an initial atom/patch $d_k$ from D and a candidate atom/patch $y_k$ generated from D (and later added to Y). The L2-norm component and the L1-norm component are thus solved together in polynomial time to identify a best candidate patch from Y, based on a comparison of that patch to the $y_k$ patch generated from atom(s) from D.

1.3. Pyramidal Object Representation

When tracking a particular object in a video, the candidate object in the current frame is taken as the area of pixels where the object was located in the previous frame. The object in the current frame is to be searched within the specified search window. The size of the search window depends on three level hierarchical pyramidal structure, as described and depicted in block 204 in FIG. 2. For example, in the first level of the pyramid, the size of the search window may be defined as 64×64 pixels. The second level depicts the size as 32×32 pixels, and last phase/level resizes the search window to 16×16 pixels. Patches of size 3×3 pixels are used in the search window of size 16×16. This pyramidal object representation helps the tracker in two ways. First, it is used to reduce the search space, thus reducing the amount of requisite computation, and thereby increasing the speed of the tracker. Second, capturing the object at different scales improves the robustness when the object undergoes scale change.

1.4. Foreground/Background Classification and Object Localization

Densely overlapped patches from the search window are selected to form the atoms of dictionary D. Local patches that are co-located in the next frame are extracted to form candidate dictionary Y. The peak patch coefficients indicate which patches from the dictionary D closely resembles the candidate patch $y_k$. In order to localize which patches belong to the tracked object and which belong to the foreground/background, Equation 2 is re-arranged to get a 2-D matrix for constructing a confidence map, thus leading to Equation 4:

$$y_{x,y} = \alpha_{x,y} D' \quad [x,y] \in O_w \quad \text{(Equation 4)}$$

where $y_{x,y}$ is a candidate patch, $\alpha_{x,y}$ is the 'n' dimensional coefficient vector for each candidate patch at location (x, y) that is generated from atoms from dictionary D', and $O_w$ indicates the object window (e.g., object window 304 shown in FIG. 3). In Equation 4, $D'=[D_o D_b]$, which is the dictionary having both object and background patches (includes both static (D) and dynamic (Y) dictionaries (collectively known as $D_o$) as well as dictionaries of patches from the foreground/background (known as $D_b$)). Background patches are used to discriminate the object patches from the background patches. Similar patches that appear in the foreground and background lead to confusion, which may distract the tracking window. Thus, the presence of the background patches in the different dictionaries avoids confusion within the patches and gives a clear object boundary.

If an object dictionary $D_o$ has of dimension m×n, (i.e., m arrays each having n atoms), then the confidence measure is cyphered as:

$$C(x, y) = \begin{cases} \max(\alpha_{xy}), & \text{if } \max(\alpha_{xy}) \in D_o \\ 0 & \text{otherwise} \end{cases} \quad \text{(Equation 5)}$$

Equation 5 classifies a patch as foreground or background. If the maximum coefficient value belongs to the object dictionary Do, then the corresponding patch is considered as an object patch. The patch with the highest confidence measure is considered to be the part of object, and the rest of the patches are considered to be the background. Object localization is achieved using a meanshift-like iterative mode seeking algorithm. This is used to calculate the shift in the object with respect to the target template. Confidence map accounts to the shift in the center pixels of the object. This local shift can be corrected by iteratively seeking the mode within object window. For example, in FIG. 4, confidence map 404 shows the confidence measure for the object (i.e., a panda) represented by dotted bounding box 403 in frame 402. An iterative shift over confidence map locates the object center as shown in confidence map 404 and confidence map 406 (which is generated by movement of the panda in frame 402). A respective bounding box 405 is shown for the search window (similar to the search window 306 depicted in FIG. 3). Thus, Equation 5 differentiates between the object being tracked and the background/foreground.

1.5. Partial Occlusion

During partial occlusion, a part of the object's information is lost (i.e., the tracked object is partially hidden). Only part of the object's structure is formed and the rest of the patches corresponding to occlusion have dispersed coefficients (i.e., confidence values of these patches are less in comparison to the confidence values for the object). Thus, the prominent patches that contain most of the information about the object are taken into consideration. It can be seen from the confidence map 504 in FIG. 5, there is no coherent structure, since some parts of the object being tracked in frame 502 has been occluded. However, a center of the object, after object localization, can be selected by using the size of the object from the previous frame, as there is a shift in the computed centroid c1. That is, the computed centroid c1 in confidence map 504 is the computed centroid that is not the actual center of the object. However, by scanning for an object window that maximizes the mean of the sparse calculations (see Equation 3), then confidence is considered as new center c2. That is, by identifying which patches are still closely related to the original patches from the earlier frame, the more closely-related patches are deemed to represent portions of the tracked object. Thus, the present tracker can survive even under partial occlusion.

1.6. Scale Variations

A confidence map computed based on the distribution of the sparse coefficients clearly signifies the variations in the size of the object. That is, there is a clear indication of a change in the size of an object, such as the panda shown in frame 602 and frame 606 in FIG. 6, as the panda walks towards the wall. This diminished size in the confidence map 608 accounts for the change in scale. However, a new bounding box 607 (i.e., search/object window) for frame 606 replaces the original bounding box 603 in frame 602 through the use of the object pyramid described in block 204 in FIG. 2. Different object sized pyramid decides the most appropriate bounding box for the object.

1.7. Template Update Strategy

Since the object's appearance keeps changing throughout the video, the target templates must be updated accurately based on the object's appearance change. Candidate patches that are not present in the Dynamic dictionary Y needs to be updated, except for the patches between the object and background. The likelihood patches to be updated is decided based on neighboring (e.g., four) connected neighbors. Patch p is updated in Y, if 'p' is not present in Y and the surrounding four patches of 'p' are all object patches or are all background patches. The intermediate patches between the object and the background adds confusion to the model and thus are not updated.

Figure 7:
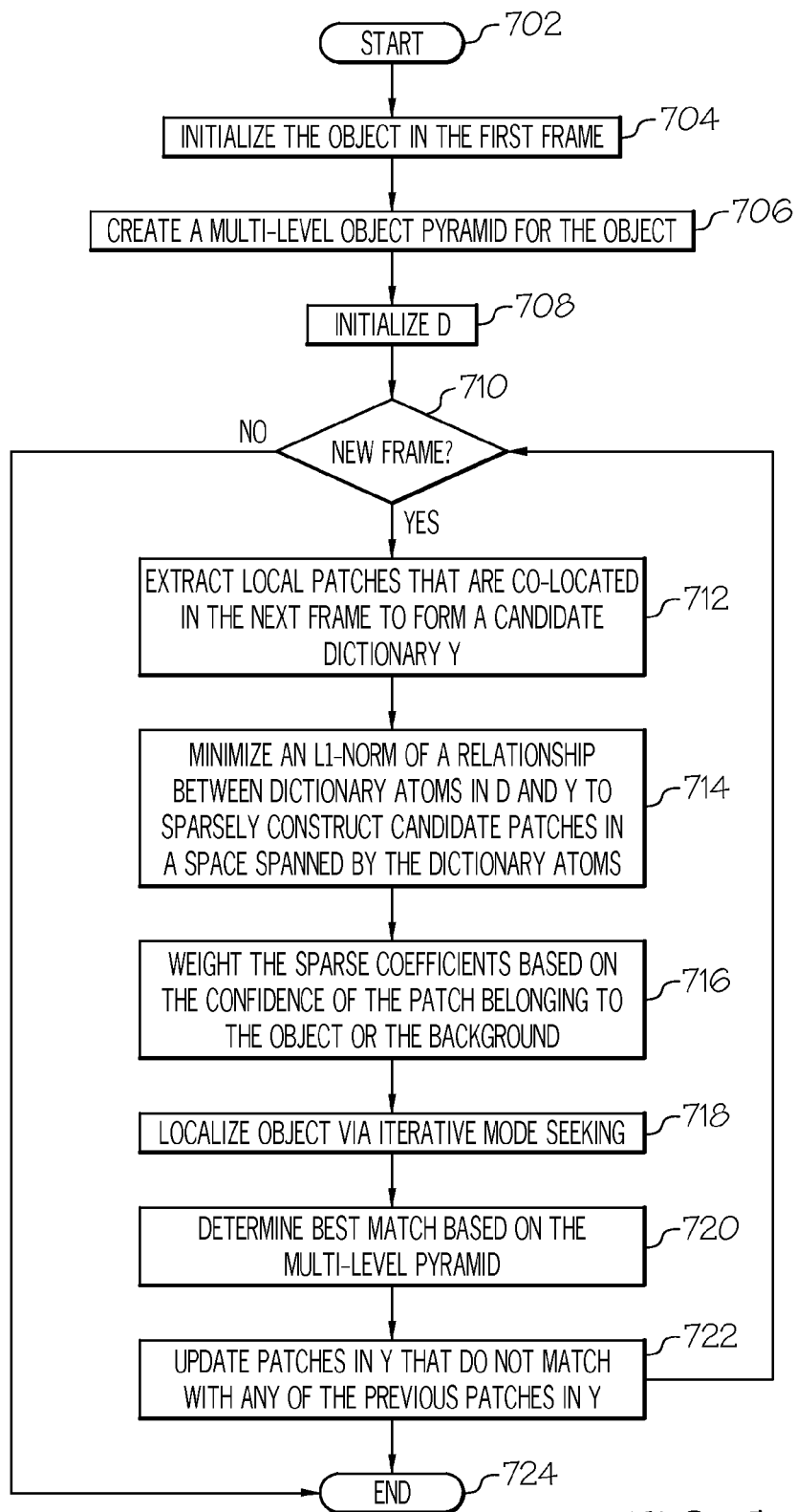
FIG. 7 depicts a high level flow-chart of one or more operations performed by one or more processors to track objects in a video.

With reference now to FIG. 7, a high-level flowchart of one or more steps performed by one or more processors to track an object in a video is presented. After initiator block 702, the object in the first frame is initialized, by setting the search/object window over the object that is to be tracked (block 704). As described in block 706, a multi-level object pyramid for the object to be tracked is set, in order to accommodate movement towards and away from the video camera. As described in block 708, the static dictionary D described herein is then initialized with the densely overlapping patches in the search/object window.

If a new frame depicting the object to be tracked is received (query block 710), then local patches that are co-located in the first frame and the new frame are extracted, thus forming the dynamic candidate dictionary Y (block 712). As described in block 714, an initial selection of which patches in the new frame match the patches in the first frame are identified by solving an L1-norm (see Equation 3 above). That is, an L1-norm that describes a relationship between dictionary atoms in D and Y is minimized, in order to sparsely construct candidate patches in a space spanned by the dictionary atoms.

As described in block 716, sparse coefficients (i.e., the Lambda multiplier used in Equation 3 above) then are weighted, based on the confidence of the patch belonging to the object or the background. If a sparse coefficient indicates that the patch belongs to the object, then that object is a good candidate for Y.

As described in block 718, the location of the tracked object is established in the new frame using iterative mode seeking, which uses the confidence maps to establish the most likely patches that are associated with the tracked object. The best match is further refined using the multi-level pyramid to account for movement towards and away from the video camera (block 720). Finally, patches in Y that are new to Y (i.e., were not identified from other new frames) are added to Y (block 722). The process ends at terminator block 724.

1.8. Results

The novel object tracker described herein has been implemented in MATLAB on a 64 bit, Intel Core i7 system having 3.4 GHz processor and 8 GB RAM. The object tracker has demonstrated on various environments, including under a trellis (to show its ability to accommodate shadowing), a face sequence (to demonstrate its capacity to handle occlusion—see FIG. 5), a panda (to demonstrate its capacity to handle movement towards and away from a video camera), and a motor vehicle (to demonstrate its capacity to handle high speed distant objects). The objects in these videos undergoes various challenges including illumination, appearance change, scale change and partial occlusion. For evaluating the performance of the present tracker, its results are compared with the other prior art trackers that do not utilize the novel features presented herein. These prior art trackers included Accelerated Proximal Gradient (APG), Visual Tracker (VT), Compressive tracker (CT), and Sparsity-based Generative Model (SGM). Table 802 in FIG. 8 summarizes the performance of the trackers under consideration. It can be seen that the presently-presented novel tracker achieves real time performance with a speed of 32 fps (frames per second) and better accuracy compared to all other trackers under consideration. Red color describes the tracker with best execution speed. Blue color denotes the second best execution speed of the tracker. Even though CT has the best execution speed, it fails to give accurate results for many videos.

Table 804 in FIG. 8 shows the trajectory error (center pixel error) plot with respect to the ground truth for the four videos using the present method and with the above listed trackers.

The present tracker survives occlusion, sudden illumination and pose change. Thus, the present invention presents a novel and unexpected improvement of the known prior art.

Thus, in one embodiment, a method to track an object in a video comprises: initializing, by one or more processors, a first frame in a video by detecting a search window over an object to be tracked, wherein initializing the first frame comprises defining multiple densely overlapping patches within the search window; populating, by one or more processors, a static dictionary D with the densely overlapping patches from the search window; detecting, by one or more processors, a new frame in the video, wherein the new frame includes the object being tracked; identifying, by one or more processors, candidate patches, in the new frame, that potentially depict the object being tracked; co-locating, by one or more processors, the candidate patches with the multiple densely overlapping patches to form a dynamic candidate dictionary Y of candidate patches; identifying, by one or more processors, candidate patches that best match the densely overlapping patches from the first frame to generate selected candidate patches by minimizing a solution:

$$\min \|D\alpha_k - y_k\|_2^2 + \lambda \|\alpha_k\|_1$$

where the solution minimizes a square of a L2-norm for a distance between atoms in a dictionary D of the densely overlapping patches times an n-dimensional coefficient vector $\alpha_k$ ($D\alpha_k$) and each candidate patch ($y_k$) in dictionary Y, plus a Lagrange Multiplier lambda ($\lambda$) times an L1-norm of $\alpha_k$, wherein the Lagrange multiplier is determined by the gradient between an initial atom $d_k$ from D and the candidate atom $y_k$ from Y; weighting, by one or more processors, the selected candidate patches based on a sparse coefficient of confidence of the selected candidate patches belonging to the object being tracked; and identifying a highest weighted candidate patch, from the selected candidate patches, as a patch that depicts the object being tracked in the new frame of the video.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method to track an object in a video, the method comprising:
   initializing, by one or more processors, a first frame in a video by detecting a search window over an object to be tracked, wherein initializing the first frame comprises defining multiple densely overlapping patches within the search window;
   populating, by one or more processors, a static dictionary D with the densely overlapping patches from the search window;
   detecting, by one or more processors, a new frame in the video, wherein the new frame includes the object being tracked;

identifying, by one or more processors, candidate patches, in the new frame, that potentially depict the object being tracked;

co-locating, by one or more processors, the candidate patches with the multiple densely overlapping patches to form a dynamic candidate dictionary Y of candidate patches;

identifying, by one or more processors, candidate patches that best match the densely overlapping patches from the first frame to generate selected candidate patches by minimizing a solution:

$$\min \|D\alpha_k - y_k\|_2^2 + \lambda \|\alpha_k\|_1$$

where the solution minimizes a square of a L2-norm for a distance between atoms in a dictionary D of the densely overlapping patches times an n-dimensional coefficient vector $\alpha_k$ ($D\alpha_k$) and each candidate patch ($y_k$) in dictionary Y, plus a Lagrange Multiplier lambda ($\lambda$) times an L1-norm of $\alpha_k$, wherein the Lagrange multiplier is determined by the gradient between an initial atom $d_k$ from D and the candidate atom $y_k$ from Y;

weighting, by one or more processors, the selected candidate patches based on a sparse coefficient of confidence of the selected candidate patches belonging to the object being tracked;

identifying, by one or more processors, a highest weighted candidate patch, from the selected candidate patches, as a patch that depicts the object being tracked in the new frame of the video; and constructing, by one or more processors, a confidence map for candidate patches in the dictionary Y, wherein the confidence map is a 2-D matrix that depicts a level of confidence that a patch from the new frame matches a densely overlapping patch from the first frame wherein the confidence map is based on:

$$y_{x,y} = \alpha_{x,y} D' \; [x,y] \epsilon O_w$$

where $\alpha_{x,y}$ is a 'n' dimensional coefficient vector for each candidate patch at location (x, y), where [x,y] are elements of ($\epsilon$) and object window ($O_w$) that describe locations in an object window in the new frame, wherein D'=[$D_o D_b$], wherein $D_o$ is a dictionary of object patches from the object being tracked, wherein $D_b$ is a dictionary of background patches outside of the object being tracked, and wherein $D_o$ and $D_b$ are both used to discriminate the object patches from the background patches.

2. The method of claim 1, further comprising:

setting, by one or more processors, a multi-level object pyramid for the object to be tracked, wherein the multi-level object pyramid comprises multiple sizes of search windows;

matching, by one or more processors, a variation in a size of the object to be tracked to one of multiple sizes of search windows, wherein said matching to the multi-level object pyramid accommodates movement towards and away from a video camera that created the video;

adjusting, by one or more processors, the confidence map computed based on a distribution of the sparse coefficients resulting from said matching of the variation in the size of the object to be tracked to said one of the multiple sizes of search windows.

3. The method of claim 2, further comprising:
cyphering, by one or more processors, the confidence measure according to:

$$C(x, y) = \begin{cases} \max(\alpha_{xy}), & \text{if } \max(\alpha_{xy}) \in D_o \\ 0 & \text{otherwise} \end{cases}$$

wherein C(x,y) classifies a patch as foreground or background based on a maximum coefficient value, wherein if a maximum coefficient value for $\alpha_{xy}$ belongs to the object dictionary Do, then a corresponding candidate patch is deemed to be an object patch.

4. The method of claim 2, further comprising:
compensating, by one or more processors, for partial occlusion of the object being tracked by identifying a centroid in the confidence map, wherein the centroid in the confidence map is determined by scanning an object window in the new frame that maximizes a mean of the sparse calculations.

5. A computer program product for tracking an object in a video, the computer program product comprising a non-transitory computer readable storage medium having program code embodied therewith, the program code readable and executable by a processor to perform a method comprising:

initializing a first frame in a video by detecting a search window over an object to be tracked, wherein initializing the first frame comprises defining multiple densely overlapping patches within the search window;

populating a static dictionary D with the densely overlapping patches from the search window;

detecting a new frame in the video, wherein the new frame includes the object being tracked;

identifying candidate patches, in the new frame, that potentially depict the object being tracked;

co-locating the candidate patches with the multiple densely overlapping patches to form a dynamic candidate dictionary Y of candidate patches;

identifying candidate patches that best match the densely overlapping patches from the first frame to generate selected candidate patches by minimizing a solution:

$$\min \|D\alpha_k - y_k\|_2^2 + \lambda \|\alpha_k\|_1$$

where the solution minimizes a square of a L2-norm for a distance between atoms in a dictionary D of the densely overlapping patches times an n-dimensional coefficient vector $\alpha_k$ ($D\alpha_k$) and each candidate patch ($y_k$) in dictionary Y, plus a Lagrange Multiplier lambda ($\lambda$) times an L1-norm of $\alpha_k$, wherein the Lagrange multiplier is determined by the gradient between an initial atom $d_k$ from D and the candidate atom $y_k$ from Y;

weighting the selected candidate patches based on a sparse coefficient of confidence of the selected candidate patches belonging to the object being tracked;

identifying a highest weighted candidate patch, from the selected candidate patches, as a patch that depicts the object being tracked in the new frame of the video; and constructing a confidence map for candidate patches in the dictionary Y, wherein the confidence map is a 2-D matrix that depicts a level of confidence that a patch from the new frame matches a densely overlapping patch from the first frame, wherein the confidence map is based on:

$$y_{x,y} = \alpha_{x,y} D' \; [x,y] \epsilon O_w$$

where $\alpha_{x,y}$ is a 'n' dimensional coefficient vector for each candidate patch at location (x, y), where [x,y] are elements of (ϵ) and object window ($O_w$) that describe locations in an object window in the new frame, wherein $D'=[D_o D_b]$, wherein $D_o$ is a dictionary of object patches from the object being tracked, wherein $D_b$ is a dictionary of background patches outside of the object being tracked, and wherein $D_o$ and $D_b$ are both used to discriminate the object patches from the background patches.

6. The computer program product of claim 5, wherein the method further comprises:
   setting a multi-level object pyramid for the object to be tracked, wherein the multi-level object pyramid comprises multiple sizes of search windows;
   matching a variation in a size of the object to be tracked to one of multiple sizes of search windows, wherein said matching to the multi-level object pyramid accommodates movement towards and away from a video camera that created the video
   adjusting the confidence map computed based on a distribution of the sparse coefficients resulting from said matching of the variation in the size of the object to be tracked to said one of the multiple sizes of search windows.

7. The computer program product of claim 6, wherein the method further comprises:
   cyphering the confidence measure according to:

$$C(x, y) = \begin{cases} \max(\alpha_{xy}), & \text{if } \max(\alpha_{xy}) \in D_o \\ 0 & \text{otherwise} \end{cases}$$

wherein C(x,y) classifies a patch as foreground or background based on a maximum coefficient value, wherein if a maximum coefficient value for $\alpha_{xy}$ belongs to the object dictionary Do, then a corresponding candidate patch is deemed to be an object patch.

8. The computer program product of claim 6, wherein the method further comprises:
   compensating for partial occlusion of the object being tracked by identifying a centroid in the confidence map, wherein the centroid in the confidence map is determined by scanning an object window in the new frame that maximizes a mean of the sparse calculations.

9. A computer system comprising:
   a processor, a computer readable memory, and a computer readable storage medium;
   first program instructions to initialize a first frame in a video by detecting a search window over an object to be tracked, wherein initializing the first frame comprises defining multiple densely overlapping patches within the search window;
   second program instructions to populate a static dictionary D with the densely overlapping patches from the search window;
   third program instructions to detect a new frame in the video, wherein the new frame includes the object being tracked;
   fourth program instructions to identify candidate patches, in the new frame, that potentially depict the object being tracked;
   fifth program instructions to co-locate the candidate patches with the multiple densely overlapping patches to form a dynamic candidate dictionary Y of candidate patches;
   sixth program instructions to identify candidate patches that best match the densely overlapping patches from the first frame to generate selected candidate patches by minimizing a solution:

$$\min \|D\alpha_k - y_k\|_2^2 + \lambda \|\alpha_k\|_1$$

where the solution minimizes a square of a L2-norm for a distance between atoms in a dictionary D of the densely overlapping patches times an n-dimensional coefficient vector $\alpha_k$ ($D\alpha_k$) and each candidate patch ($y_k$) in dictionary Y, plus a Lagrange Multiplier lambda (λ) times an L1-norm of $\alpha_k$, wherein the Lagrange multiplier is determined by the gradient between an initial atom $d_k$ from D and the candidate atom $y_k$ from Y;
   seventh program instructions to weight the selected candidate patches based on a sparse coefficient of confidence of the selected candidate patches belonging to the object being tracked;
   eighth program instructions to identify a highest weighted candidate patch, from the selected candidate patches, as a patch that depicts the object being tracked in the new frame of the video;
   ninth program instructions to construct a confidence map for candidate patches in the dictionary Y, wherein the confidence map is a 2-D matrix that depicts a level of confidence that a patch from the new frame matches a densely overlapping patch from the first frame wherein the confidence map is based on:

$$y_{x,y} = \alpha_{xy} D' \; [x,y] \in O_w$$

where $\alpha_{xy}$ is a 'n' dimensional coefficient vector for each candidate patch at location (x, y), where [x,y] are elements of (ϵ) and object window ($O_w$) that describe locations in an object window in the new frame, wherein $D'=[D_o D_b]$, wherein $D_o$ is a dictionary of object patches from the object being tracked, wherein $D_b$ is a dictionary of background patches outside of the object being tracked, and wherein $D_o$ and $D_b$ are both used to discriminate the object patches from the background patches; and wherein the first, second, third, fourth, fifth, sixth, seventh, eighth, and ninth program instructions are stored on the computer readable storage medium for execution by the processor via the computer readable memory.

10. The computer system of claim 9, further comprising:
    tenth program instructions to set a multi-level object pyramid for the object to be tracked, wherein the multi-level object pyramid comprises multiple sizes of search windows;
    eleventh program instructions to match a variation in a size of the object to be tracked to one of multiple sizes of search windows, wherein said matching to the multi-level object pyramid accommodates movement towards and away from a video camera that created the video
    twelfth program instructions to adjust the confidence map computed based on a distribution of the sparse coefficients resulting from said matching of the variation in the size of the object to be tracked to said one of the multiple sizes of search windows; and wherein
the tenth, eleventh, and twelfth program instructions are stored on the computer readable storage medium for execution by the processor via the computer readable memory.

11. The computer system of claim 10, further comprising:
thirteenth program instructions to cypher the confidence measure according to:

$$C(x, y) = \begin{cases} \max(\alpha_{xy}), & \text{if } \max(\alpha_{xy}) \in D_o \\ 0 & \text{otherwise} \end{cases}$$

wherein C(x,y) classifies a patch as foreground or background based on a maximum coefficient value, wherein if a maximum coefficient value for $\alpha_{xy}$ belongs to the object dictionary Do, then a corresponding candidate patch is deemed to be an object patch; and wherein
the thirteenth program instructions are stored on the computer readable storage medium for execution by the processor via the computer readable memory.

12. The computer system of claim 10, further comprising:
thirteenth program instructions to compensate for partial occlusion of the object being tracked by identifying a centroid in the confidence map, wherein the centroid in the confidence map is determined by scanning an object window in the new frame that maximizes a mean of the sparse calculations; and wherein
the thirteenth program instructions are stored on the computer readable storage medium for execution by the processor via the computer readable memory.

* * * * *